United States Patent
Okumura et al.

(10) Patent No.: US 11,193,831 B2
(45) Date of Patent: Dec. 7, 2021

(54) METHOD FOR MANUFACTURING NEAR-INFRARED SENSOR COVER

(71) Applicants: TOYODA GOSEI CO., LTD., Kiyosu (JP); NISSHA CO., LTD., Kyoto (JP)

(72) Inventors: Koji Okumura, Kiyosu (JP); Koji Fukagawa, Kiyosu (JP); Hiroyuki Konishi, Kyoto (JP); Tatsuo Ito, Kyoto (JP)

(73) Assignees: TOYODA GOSEI CO., LTD., Aichi-pref. (JP); NISSHA CO., LTD., Kyoto (JP)

(*) Notice: Subject to any disclaimer, the term of this patent is extended or adjusted under 35 U.S.C. 154(b) by 0 days.

(21) Appl. No.: 17/034,497

(22) Filed: Sep. 28, 2020

(65) Prior Publication Data

US 2021/0096030 A1    Apr. 1, 2021

(30) Foreign Application Priority Data

Oct. 1, 2019  (JP) .............................. JP2019-181294

(51) Int. Cl.
*G01J 5/08* (2006.01)
*G02B 5/26* (2006.01)

(52) U.S. Cl.
CPC .............. *G01J 5/0853* (2013.01); *G02B 5/26* (2013.01)

(58) Field of Classification Search
CPC ........ G01J 5/0853; G01J 1/0407; G02B 5/26; B29D 11/0073
See application file for complete search history.

(56) References Cited

U.S. PATENT DOCUMENTS

| | | | | |
|---|---|---|---|---|
| 5,569,474 A | * | 10/1996 | Kitaichi | .................. B29C 33/08 219/541 |
| 6,103,998 A | | 8/2000 | Kuno et al. | |
| 10,698,085 B2 | * | 6/2020 | Okumura | .............. G01S 7/4813 |
| 10,794,757 B2 | * | 10/2020 | Okumura | .............. G01J 1/0488 |
| 2005/0035491 A1 | | 2/2005 | Bagnall et al. | |
| 2017/0352938 A1 | | 12/2017 | Okumura et al. | |
| 2021/0096221 A1 | | 4/2021 | Okumura et al. | |
| 2021/0148761 A1 | * | 5/2021 | Okumura | .............. G01S 7/4813 |

FOREIGN PATENT DOCUMENTS

| | | | |
|---|---|---|---|
| DE | 19927999 A1 | 12/1999 | |
| DE | 60121974 T2 | 3/2007 | |
| EP | 3252494 A1 | 12/2017 | |
| EP | 3798681 A1 | 3/2021 | |
| JP | 2018-031888 A | 3/2018 | |
| WO | WO-2018052057 A1 * | 3/2018 | ............... G02B 5/26 |

OTHER PUBLICATIONS

German Office Action dated Apr. 30, 2021, issued in corresponding German Patent Application No. 102020125245.5 (and English Machine Translation).

* cited by examiner

*Primary Examiner* — David P Porta
*Assistant Examiner* — Meenakshi S Sahu
(74) *Attorney, Agent, or Firm* — Posz Law Group, PLC

(57) ABSTRACT

A method for manufacturing a near-infrared sensor cover includes a film setting step. The film setting step includes setting a heater film on a first molding die and setting a hard coating film on a second molding die. The method for manufacturing a near-infrared sensor cover further includes a base molding step for molding a base including clamping a mold, injecting molten plastic into a gap between the heater film and the hard coating film, and curing the molten plastic.

4 Claims, 7 Drawing Sheets

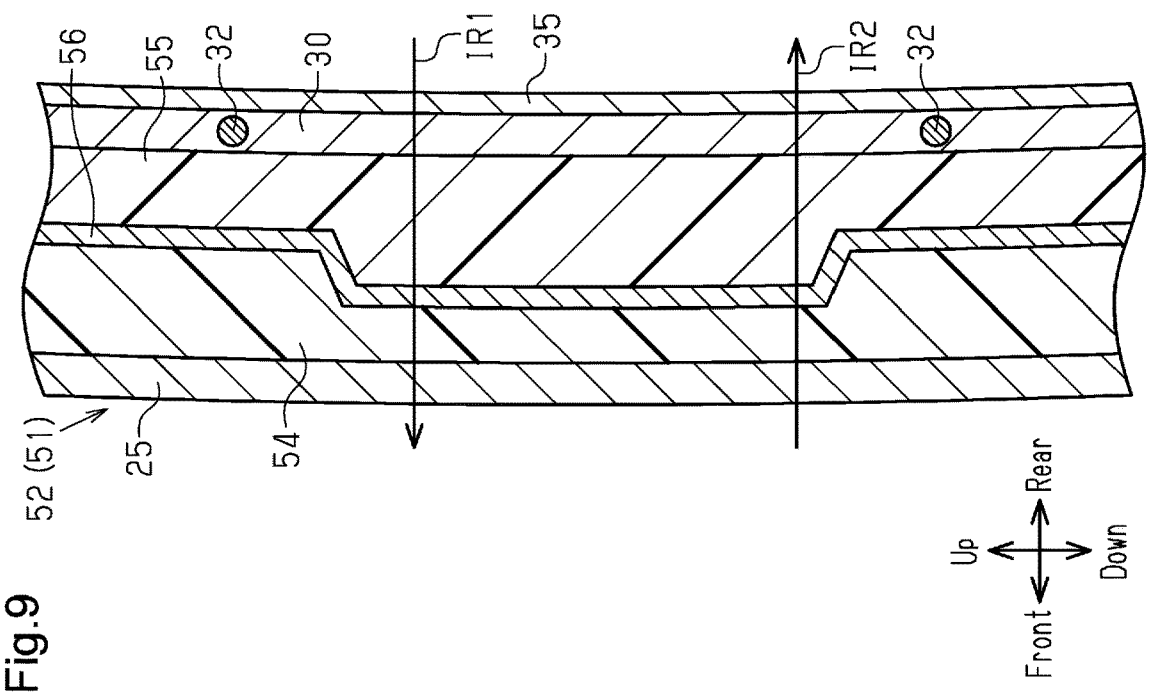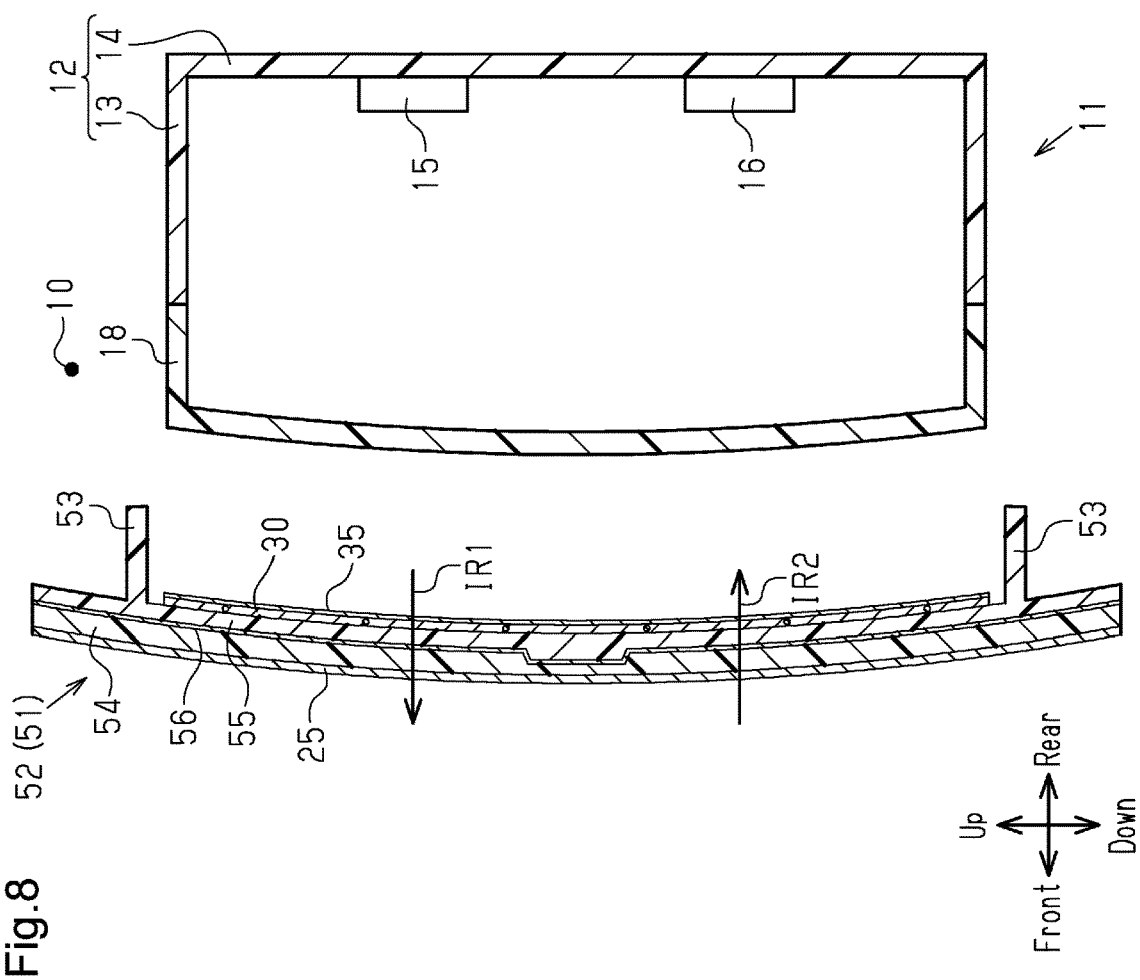

METHOD FOR MANUFACTURING NEAR-INFRARED SENSOR COVER

BACKGROUND

1. Field

The present disclosure relates to a method for manufacturing a near-infrared sensor cover configured to cover a transmitting unit and a receiving unit for near-infrared rays in a near-infrared sensor.

2. Description of Related Art

A near-infrared sensor mounted on a vehicle includes a transmitting unit and a receiving unit for near-infrared rays. The transmitting unit and the receiving unit are covered with a cover body of a near-infrared sensor cover. The cover body has transmissiveness to near-infrared rays.

In the near-infrared sensor above, the transmitting unit transmits near-infrared rays to the outside of the vehicle through the cover body. After striking and being reflected by an object outside the vehicle, such as a leading vehicle or a pedestrian, the near-infrared rays return to and are received by the receiving unit through the cover body. On the basis of the transmitted near-infrared rays and the received near-infrared rays, the near-infrared sensor recognizes the object outside the vehicle, and detects the distance between the vehicle and the object and the relative velocity.

When snow accumulates on the near-infrared sensor, the accumulated snow hinders passage of near-infrared rays. Accordingly, the near-infrared sensor is configured to temporarily stop detection when snow accumulates on the sensor. However, due to widespread use of near-infrared sensors, it is desired that detection be performed during snowfall.

Accordingly, various types of near-infrared sensor covers equipped with a snow melting function have been developed. For example, Japanese Laid-Open Patent Publication No. 2018-31888 discloses a near-infrared sensor cover including a cover body and a heater unit. The cover body includes a transparent base, which forms the framework of the cover body. The heater unit is stacked on the base of the cover body from the rear side in the transmission direction of the near-infrared rays. A heater film that includes wire-like heating element is used as the heater unit. The heating element generates heat when energized. The heater film includes the heating element and two transparent bases. The transparent bases are made of plastic and coat the heating element by sandwiching the heating element from the front and rear in the transmission direction.

When the heater unit is stacked on the base, the heater film is bonded to the base. To perform such bonding, the foremost section of the heater film in the transmission direction is formed by a bonding layer. As the bonding layer, a film-like optical bonding layer called an optically clear adhesive (OCA) is used. The heater film is bonded to the base of the cover body at the OCA.

The above publication discloses that the front surface of a member that forms the foremost section of the cover body in the transmission direction can be covered with a hard coating layer having a hardness higher than that of that member. The hard coating layer is formed by applying a surface treatment agent to the front surface of the member.

The technique of the above publication requires a step for bonding the heater film to the rear surface of the base in the transmission direction at the OCA during the manufacture of the near-infrared sensor cover. The technique of the above publication further requires a step for forming a hard coating layer on the front surface of the base in the transmission direction by applying surface treatment agent to the front surface. This increases the number of manufacturing steps.

SUMMARY

Accordingly, it is an objective of the present disclosure to provide a method for manufacturing a near-infrared sensor cover that allows a near-infrared sensor cover to be manufactured in a small number of steps.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a manufacturing method for manufacturing a near-infrared sensor cover using a mold including a first molding die and a second molding die is provided. The near-infrared sensor cover includes a cover body. The cover body is configured to cover a transmitting unit and a receiving unit for near-infrared rays in a near-infrared sensor and has transmissiveness to near-infrared rays. The cover body includes a base made of a plastic, a hard coating film that is arranged forward of the base in a transmission direction of the near-infrared rays and has a hardness higher than that of the base, and a heater film that is arranged rearward of the base in the transmission direction and has a wire-like heating element. The heating element generates heat when energized. The manufacturing method includes: a film setting step including setting the heater film on the first molding die, and setting the hard coating film on the second molding die; and a base molding step for molding the base including clamping the mold, injecting molten plastic into a gap between the heater film and the hard coating film, and curing the molten plastic.

In another general aspect, a manufacturing method for manufacturing a near-infrared sensor cover using a primary mold and a secondary mold is provided. The primary mold includes a common molding die and a primary molding die. The secondary mold includes the common molding die and a secondary molding die. The near-infrared sensor cover includes a cover body. The cover body is configured to cover a transmitting unit and a receiving unit for near-infrared rays in a near-infrared sensor and has transmissiveness to near-infrared rays. The cover body includes a decorative film, a front base that is made of a plastic and is arranged forward of the decorative film in a transmission direction of the near-infrared rays, a rear base that is made of a plastic and is arranged rearward of the decorative film in the transmission direction, a hard coating film that is arranged forward of the front base in the transmission direction and has a hardness higher than that of the front base, and a heater film that is arranged rearward of the rear base in the transmission direction and has a wire-like heating element. The heating element generates heat when energized. The manufacturing method includes: a film setting step including setting the heater film on the common molding die, setting the decorative film on the primary molding die, and setting the hard coating film on the secondary molding die; a rear base molding step for forming an intermediate by molding the rear base by clamping the primary mold, injecting molten plastic into a gap between the heater film and the decorative film, and curing the molten plastic, the intermediate including the rear base closely attached to the heater film and the decorative film; and a front base molding step including opening the primary mold and the secondary mold, and moving the common molding die, which is holding the intermediate, from a position opposed to the primary molding die to a position opposed to the secondary molding die, and after the common molding die is moved, molding the front base by clamping the secondary mold, injecting molten plastic into a gap between the decorative film and the hard coating film, and curing the molten plastic.

Other features and aspects will be apparent from the following detailed description, the drawings, and the claims.

BRIEF DESCRIPTION OF THE DRAWINGS

FIG. 8 is a cross-sectional side view showing, together with a near-infrared sensor, a near-infrared sensor cover according to a second embodiment, which is provided separately from the near-infrared sensor.

FIG. 9 is an enlarged partial cross-sectional side view showing part of the cover body in FIG. 8.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A method for manufacturing a near-infrared sensor cover according to a first embodiment will now be described with reference to FIGS. 1 to 7.

In the following description, the direction in which the vehicle advances forward will be referred to as the front, and the reverse direction will be referred to as the rear. In FIGS. 1 to 7, in order to make the size of each component of the near-infrared sensor cover recognizable, the scale of each component is altered as necessary. The same applies to FIGS. 8 to 15, which illustrate a second embodiment.

Figure 1:
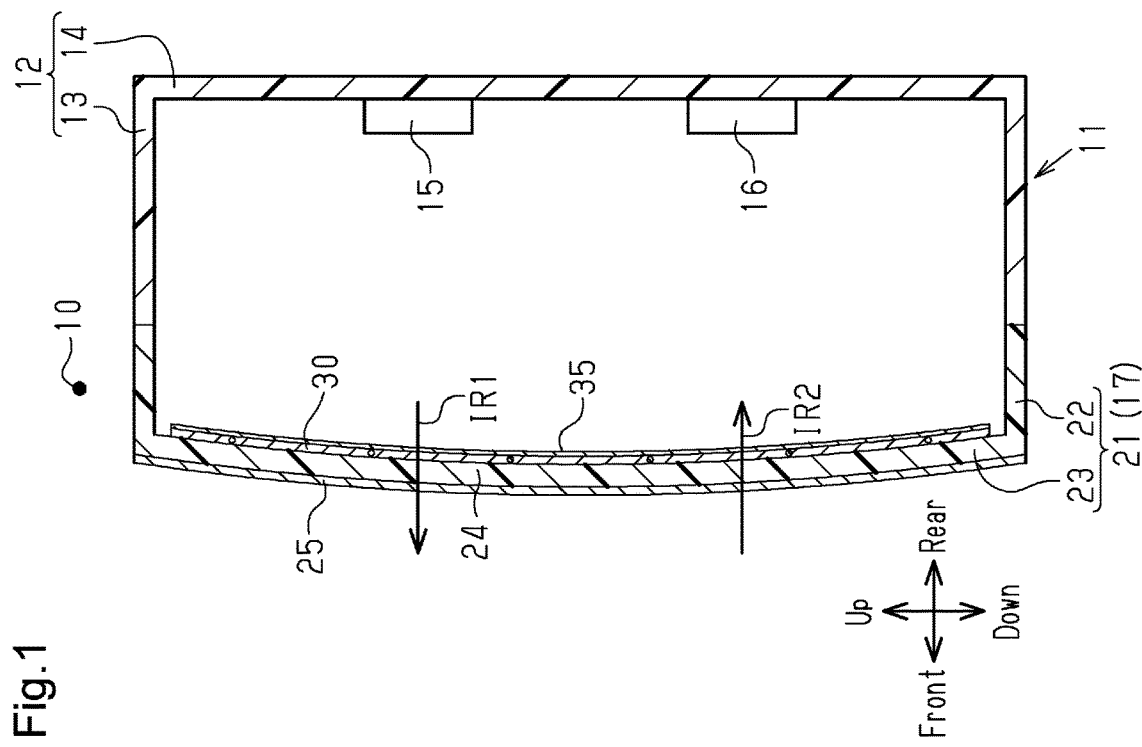
FIG. 1 is a cross-sectional side view of a near-infrared sensor including a near-infrared sensor cover according to a first embodiment.

As shown in FIG. 1, a vehicle 10 includes a near-infrared sensor 11 in the front end section. The near-infrared sensor 11 is configured to transmit infrared rays IR1 having a wavelength of around 900 nm forward from the vehicle 10 and receive infrared rays IR2 that have struck and been reflected by an object outside the vehicle 10, such as a leading vehicle or a pedestrian. On the basis of the transmitted near-infrared rays IR1 and the received near-infrared rays IR2, the near-infrared sensor 11 recognizes the object outside the vehicle 10, and detects the distance between the vehicle 10 and the object and the relative velocity.

As described above, the near-infrared sensor 11 transmits the near-infrared rays IR1 forward from the vehicle 10. Thus, the transmission direction of the near-infrared rays IR1 from the near-infrared sensor 11 is the direction from the rear toward the front of the vehicle 10. The front in the transmission direction of the near-infrared rays IR1 substantially matches with the front of the vehicle 10. The rear in the transmission direction also substantially matches with the rear of the vehicle 10. Accordingly, in the following description, the front in the transmission direction of the near-infrared rays IR1 will simply be referred to as "front" or "forward." The rear in the transmission direction will simply be referred to as "rear" or "rearward."

The rear half of the outer shell of the near-infrared sensor 11 is formed by a case 12. The front half of the outer shell of the near-infrared sensor 11 is formed by a cover 17. The case 12 includes a tubular peripheral wall 13 and a bottom wall 14, which is provided at the rear end of the peripheral wall 13. The case 12 has the shape of a tube with an open front end and a closed end. The case 12 is entirely made of a plastic such as a polybutylene terephthalate (PBT). A transmitting unit 15, which is configured to transmit near-infrared rays IR1, and a receiving unit 16, which is configured to receive near-infrared rays IR2, are arranged on the front side of the bottom wall 14.

The cover 17 of the near-infrared sensor 11 is formed by a near-infrared sensor cover 21. The near-infrared sensor cover 21 includes a tubular peripheral wall 22 and a plate-shaped cover body 23 provided at the front end of the peripheral wall 22.

The cover body 23 is shaped to have a size sufficient to close the opening at the front end of the case 12. The cover body 23 is located forward of the bottom wall 14 and directly covers the transmitting unit 15 and the receiving unit 16 from the front.

Figure 2:
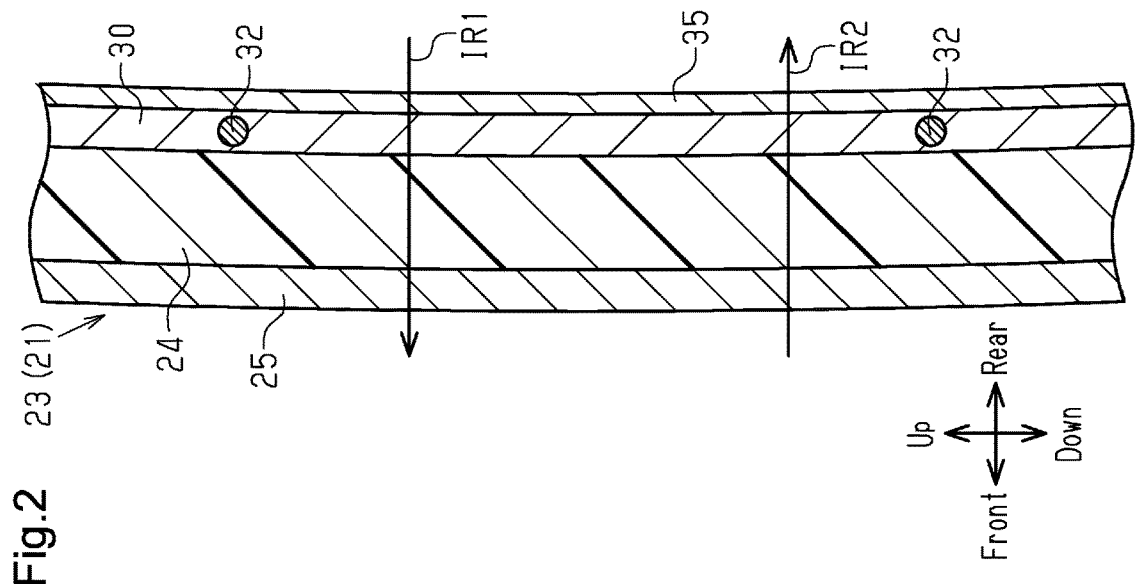
FIG. 2 is an enlarged partial cross-sectional side view showing part of the cover body in FIG. 1.

As shown in FIG. 2, the framework of the cover body 23 includes a base 24. The base 24 is made of a transparent plastic having transmissiveness to the near-infrared rays IR1, IR2. The term "transparent" as used in the present disclosure includes not only "colorless transparent," but also "colored transparent." In the first embodiment, the base 24 is made of polycarbonate (PC). However, the base 24 may be made of other material such as polymethacrylic acid methyl (PMMA) or cycloolefin polymer (COP).

A hard coating film 25 is provided on and closely attached to the front surface of the base 24. The hard coating film 25 has transmissiveness to the near-infrared rays IR1, IR2 and has a hardness higher than that of the base 24. The hard coating film 25 is formed by applying a known surface treatment agent to a film substrate made of a transparent plastic such as PC or PMMA. The surface treatment agent may be an organic hard coating agent, an inorganic hard coating agent, and an organic-inorganic hybrid hard coating agent. The organic hard coating agent includes an acrylate-based surface treatment agent, an oxetane-based surface treatment agent, and a silicone-based surface treatment agent. Alternatively, a transfer film may be used as the hard coating film 25.

Figure 3:
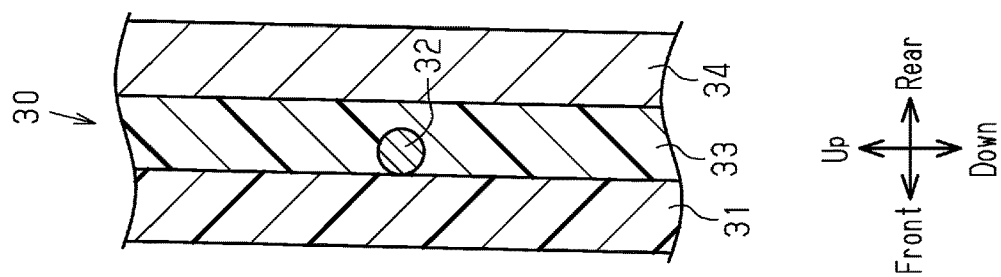
FIG. 3 is a partial cross-sectional side view illustrating a layer structure of a heater film according to the first embodiment.

A heater film 30 is stacked on the rear surface of the base 24. The heater film 30 includes a wire-like heating element (heating wire), which generates heat when energized. As shown in FIG. 3, the heater film 30 includes a front transparent base 31, a heating element 32, a rear transparent base 33, optically clear adhesive (OCA) 34, which are arranged in that order from the front to the rear.

The heating element 32 is made of a metal such as silver or copper, metal oxide-based conductive material such as indium tin oxide (ITO) or tin oxide, a carbon heating element, and a conductive paste. The front transparent base 31 and the rear transparent base 33 are both made of a transparent plastic such as polycarbonate (PC) and coat the heating element 32 by sandwiching the heating element 32 from the front and rear.

OCA is not provided on the front side of the front transparent base 31 of the heater film 30.

As shown in FIGS. 1 and 2, a reflection suppression layer (also referred to as an AR coating) 35 is provided rearward of the heater film 30. The reflection suppression layer 35 is a transparent thin film. The reflection suppression layer 35 reduces reflection of the near-infrared rays IR1 at the rear surface of the cover body 23 by means of interference of the near-infrared rays IR1, so as to limit the reduction in the amount of near-infrared rays IR1 passing through the cover body 23 due to reflection. The reflection suppression layer 35 is made of a dielectric substance such as magnesium fluoride ($MgF_2$), and is formed by performing vacuum deposition, sputtering, or wet coating.

The reflection suppression layer 35 may be formed by a single layer of a thin film or multiple layers of thin films. In the latter case, thin films may include films having different refractive indexes or thicknesses. This configuration reduces reflection of the near-infrared rays IR1 in a wide range of wavelengths.

Alternatively, the reflection suppression layer 35 may be formed by a lamination of metal oxide such as titanium dioxide ($TiO_2$) or silicon dioxide ($SiO_2$).

The reflection suppression layer 35 is bonded to the rear transparent base 33 of the heater film 30 with the OCA 34 in between.

The transmissivity to the near-infrared rays IR1, IR2 of the cover body 23, which has the above-described structure, is 60% or higher. The reflectance to the near-infrared rays IR1 at the rear surface of the cover body 23 is 10% or lower.

An operation of the first embodiment, which is configured as described above, will now be described, together with a method for manufacturing the near-infrared sensor cover 21. Advantages that accompany the operation will also be described.

Figure 5:
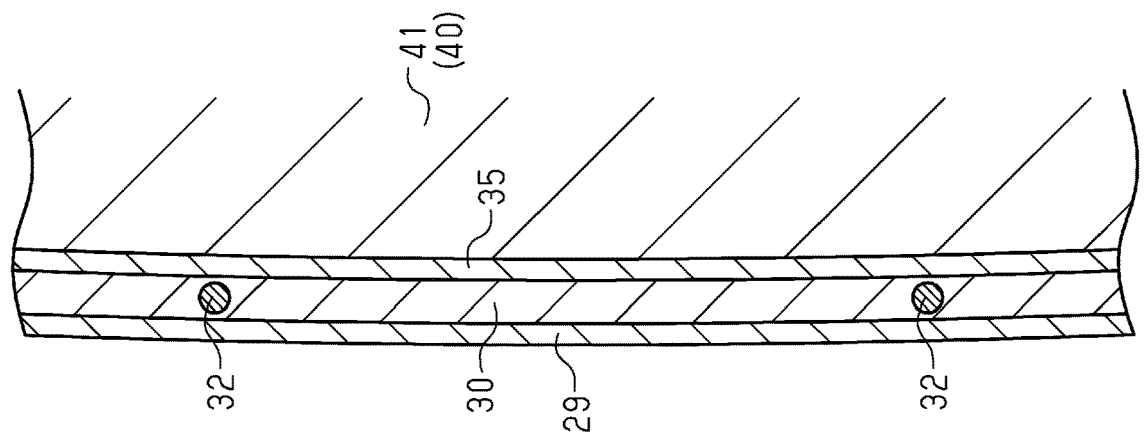
FIG. 5 is a partial cross-sectional side view of the first molding die, the reflection suppression layer, the heater film, and the binder layer in FIG. 4.
Figure 4:
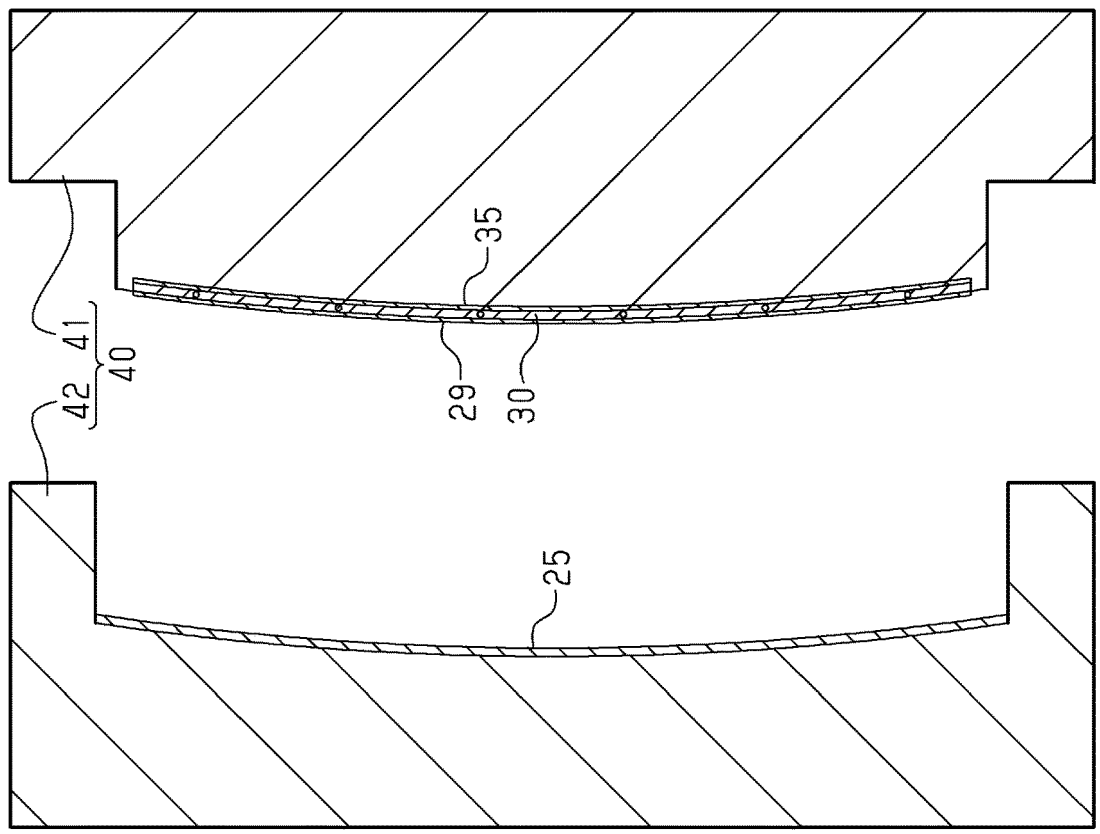
FIG. 4 is a cross-sectional side view illustrating a film setting step according to the first embodiment.

As shown in FIGS. 4 and 5, the near-infrared sensor cover 21 is manufactured by using a mold 40 and through a film setting step and a base molding step. The mold 40 includes a first molding die 41 and a second molding die 42.

In the film setting step, the heater film 30, with the reflection suppression layer 35 bonded to the rear surface and a binder layer 29 formed on the front surface, is set on the first molding die 41 of the opened mold 40. The binder layer 29 is stacked on the front surface of the heater film 30 to limit transfer of heat and pressure to the heater film 30 when the base 24 is molded. The hard coating film 25 is set on the second molding die 42 of the opened mold 40.

Figure 7:
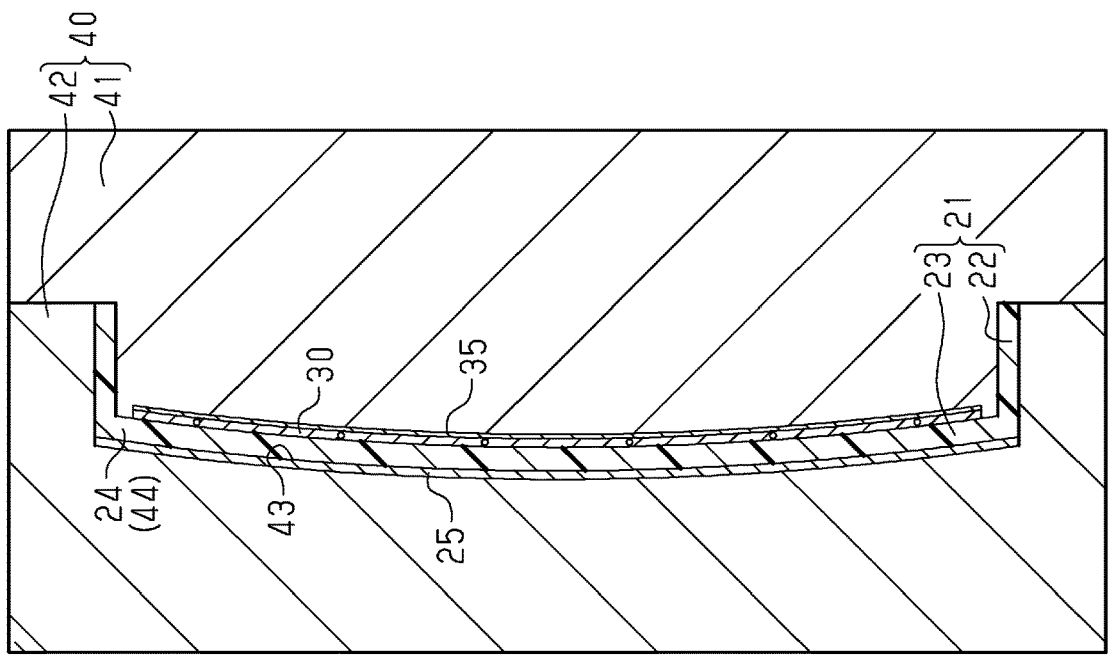
FIG. 7 is a cross-sectional side view showing a state in which molten plastic has been injected into the gap between the heater film and the hard coating film shown in FIG. 6, and the molten plastic has been cured.
Figure 6:
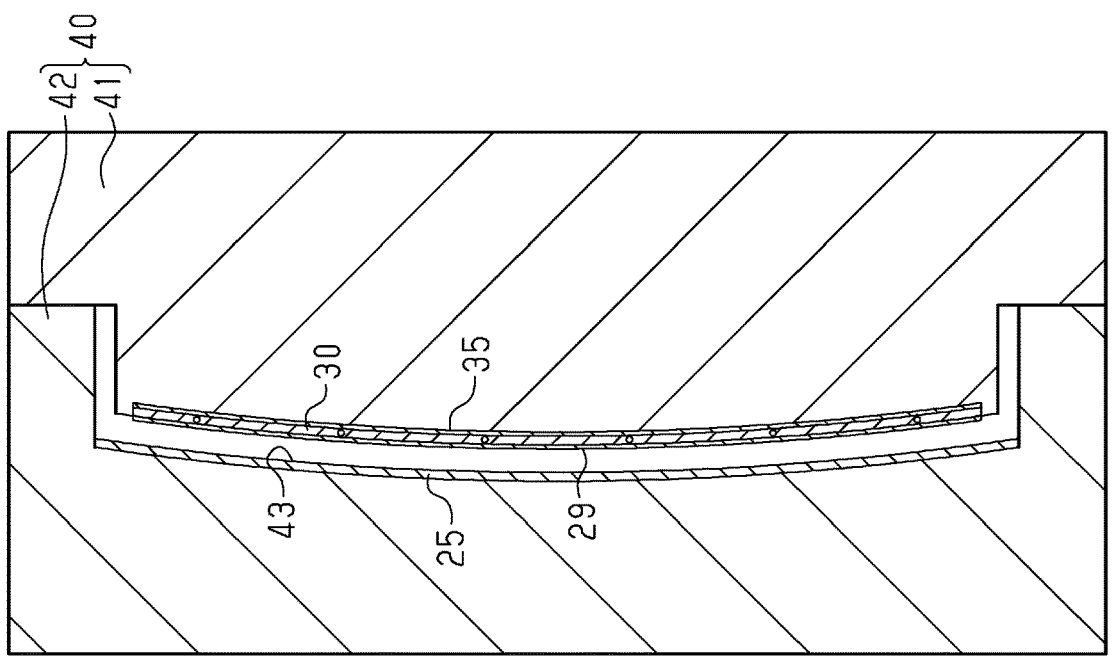
FIG. 6 is a cross-sectional side view showing a state in which the mold is clamped in a base molding step of the first embodiment.

In the base molding step, the mold 40 is clamped as shown in FIG. 6. As the mold 40 is clamped, a gap (cavity) 43 is created between the heater film 30 and the hard coating film 25. As shown in FIG. 7, the gap 43 is filled with molten plastic 44. At this time, if the heat and the pressure of the molten plastic 44 are transferred to the heater film 30, the heater film 30 may be damaged.

In this regard, the heater film 30 of the first embodiment, which is set on the first molding die 41, has the binder layer 29 on the front surface. The heat and the pressure of the molten plastic 44 are thus transferred to the heater film 30 via the binder layer 29. The binder layer 29 reduces the heat and the pressure transferred to the heater film 30. As compared to a case in which the binder layer 29 is not provided, the damage to the heater film 30 due to heat and pressure is reduced. The binder layer 29 is melted by the heat of the molten plastic 44 and disappears.

When the molten plastic 44 is cured, the base 24 is molded so as to be closely attached to the heater film 30 and the hard coating film 25. Also, the peripheral wall 22 is molded to be continuous with the base 24.

In this manner, at the same time as the base 24 is molded, the heater film 30 is stacked on the rear surface of the base 24 so as to be closely attached to the base 24. Also, at the same time as the base 24 is molded, the hard coating film 25 is stacked on the front surface of the base 24 so as to be closely attached to the base 24. In other words, in the base molding step, the molding of the base 24, the stacking of the heater film 30, and the staking of the hard coating film 25 are performed simultaneously.

Thus, unlike the conventional technique, the present embodiment does not require a step for bonding the heater film 30 to the rear surface of the base 24 during the manufacture of the near-infrared sensor cover 21. Also, the present embodiment does not require a step for forming a hard coating layer by applying a surface treatment agent on the front surface of the base 24. This reduces the number of manufacturing steps.

The near-infrared sensor cover 21, which is manufactured in the above-described manner, is used as the cover 17 of the near-infrared sensor 11 as shown in FIG. 1. In the vehicle 10 equipped with the near-infrared sensor 11, when the transmitting unit 15 of the near-infrared sensor 11 transmits near-infrared rays IR1, the near-infrared rays IR1 are radiated on the rear surface of the cover body 23. At this time, the reflection suppression layer 35 reduces reflection of the radiated near-infrared rays IR1 on the rear surface of the cover body 23. The reflectance for the near-infrared rays IR1 is reduced to 10% or lower. The reduction in the reflectance increases the amount of the near-infrared rays IR1 that pass through the reflection suppression layer 35, accordingly.

After passing through the reflection suppression layer 35, the near-infrared rays IR1 pass through the heater film 30, the base 24, and the hard coating film 25 in that order. In this manner, the near-infrared rays IR1 pass through the cover body 23.

After passing through the cover body 23, the near-infrared rays IR1 strike and are reflected by an object, such as a leading vehicle or a pedestrian. The reflected near-infrared rays IR2 again pass through the hard coating film 25, the base 24, the heater film 30, and the reflection suppression layer 35 of the cover body 23 in that order. After passing through the cover body 23, the near-infrared rays IR2 are received by the receiving unit 16. On the basis of the transmitted near-infrared rays IR1 and the received near-infrared rays IR2, the near-infrared sensor 11 recognizes the object and detects the distance between the vehicle 10 and the object and the relative velocity.

The above-described suppression of the reflection the near-infrared rays IR1 on the reflection suppression layer 35 increases the amount of the near-infrared rays IR1, IR2 passing through the cover body 23, accordingly.

Since the transmissivity to the near-infrared rays IR1, IR2 of the cover body 23 is 60% or higher, the cover body 23 is unlikely to hinder passage of the near-infrared rays IR1, IR2. The amount of the near-infrared rays IR1, IR2 that is attenuated by the cover body 23 is limited to a permissible range. This allows the near-infrared sensor 11 to readily recognize the object, and detect the distance and the relative velocity.

Further, in the near-infrared sensor cover 21, the hard coating film 25 formed on the front surface of the base 24 increases the impact resistance of the cover body 23. The hard coating film 25 prevents the front surface of the cover body 23 from being scratched by flying pebbles and the like. Further, the hard coating film 25 increases the weather resistance of the cover body 23. Thus, the hard coating film 25 prevents the cover body 23 from being altered or degraded due to sunlight, weather, temperature changes, and the like. This also allows the near-infrared sensor 11 to readily recognize the object, and detect the distance and the relative velocity.

The heating element 32 of the heater film 30 generates heat when energized. Some of the heat is transferred to the front surface of the cover body 23. When snow accumulates on the front surface of the cover body 23, the snow is melted by the heat from the heating element 32, which is generated when the heating element 32 is energized. This allows the near-infrared sensor 11 to recognize an object, and detect the distance to the object and the relative velocity even when it is snowing.

In addition to the ones listed above, the first embodiment has the following advantages.

In the conventional technique, the heater film used as a heater unit has a multilayer structure including a wire-like heating element, two transparent bases, which sandwich the heating element from the front and the rear, and two layers of OCA, which sandwich the transparent bases from the front and the rear. An increase in the number of layers causes various drawbacks including the ones discussed below.

(a) The use of a heater film increases the number of interfaces between layers, at which reflection and absorption of near-infrared rays take place. Accordingly, the amount of reflection and absorption of near-infrared rays increases due to the heater film. This reduces the detection accuracy of the near-infrared sensor.

(b) A not insignificant amount of near-infrared rays is refracted at the interface between layers. As the number of interfaces increases, the total refraction angle increases. This reduces the detection accuracy regarding angles of the near-infrared sensor.

(c) As the number of layers increases, the number of manufacturing steps and the quantity of material for the heater unit are increased, which increases the manufacturing costs.

(d) Adjacent layers may peel from each other. Thus, as the number of layers increases, the number of sections of possible peeling also increases. Peeling is more likely to occur as the difference in the coefficient of thermal expansion between adjacent layers increases. It thus becomes difficult to ensure close attachment at the interfaces as the number of layers increases.

However, in the first embodiment, since the binder layer 29 is used, the OCA on the front side in the conventional technique is omitted as shown in FIG. 3. As described above, the binder layer 29 is melted by the heat and disappears when the base 24 is molded. The omission of the OCA on the front side reduces the number of elements of the heater film 30. Accordingly, the present embodiment improves the configuration with regard to the items (a) to (d), as compared to a configuration in which the heater unit includes a conventional heater film having an OCA on the front surface.

Second Embodiment

Next, a method for manufacturing a near-infrared sensor cover according to a second embodiment will now be described with reference to FIGS. 8 to 15.

As shown in FIGS. 8 and 9, a near-infrared sensor cover 51 according to the second embodiment is provided separately from a near-infrared sensor 11. More specifically, the near-infrared sensor 11 is formed by a case 12 and a cover 18. A transmitting unit 15 and a receiving unit 16 are provided in the case 12. The cover 18 is arranged on the front side of the case 12 and directly covers the transmitting unit 15 and the receiving unit 16. The cover 18 is made of a plastic that contains a visible light blocking pigment, such as PC, PMMA, COP, or plastic glass.

The near-infrared sensor cover 51 includes a plate-shaped cover body 52 and an attachment portion 53 protruding rearward from the rear surface of the cover body 52. The cover body 52 is located forward of the cover 18 to indirectly cover the transmitting unit 15 and the receiving unit 16 from the front, with the cover 18 in between. The near-infrared sensor cover 51 is attached to the front end section of the vehicle 10 at the attachment portion 53.

The near-infrared sensor cover 51 not only covers the transmitting unit 15 and the receiving unit 16 from the front like the cover 17 of the near-infrared sensor 11 in the first embodiment, but also functions as a garnish for decorating the front section of the vehicle 10.

Thus, as shown in FIG. 9, the near-infrared sensor cover 51 of the second embodiment basically includes a hard coating film 25, a base, and a heater film 30 with a reflection suppression layer 35 formed on the rear surface, as in the first embodiment. The heater film 30 of the second embodiment has a layer structure similar to the heater film 30 of the first embodiment (refer to FIG. 3).

The second embodiment is different from the first embodiment in that the base includes a front base 54 forming the front section and a rear base 55 forming a rear section, and that a decorative film 56 is provided between the front base 54 and the rear base 55.

Like the base 24 of the first embodiment, the front base 54 and the rear base 55 are made of a transparent plastic and have transmissiveness to the near-infrared rays IR1, IR2. The decorative film 56 is a layer that decorates the near-infrared sensor cover 51, and is formed to have protrusions and recesses in the front-rear direction. The decorative film 56 reflects visible light and allows near-infrared rays IR1, IR2 to pass through.

The reflection suppression layer 35 is bonded to the rear transparent base 33 of the heater film 30 with the OCA 34 in between, shown in FIG. 3.

The transmissivity to the near-infrared rays IR1, IR2 of the cover body 52, which has the above-described structure, is 60% or higher. The reflectance to the near-infrared rays IR1 at the rear surface of the cover body 52 is 10% or lower.

The configuration, other than the above, is the same as the first embodiment. Thus, the same components as those in the first embodiment are given the same reference numerals, and detailed explanations are omitted.

An operation of the second embodiment, which is configured as described above, will now be described, together with a method for manufacturing the near-infrared sensor cover 51. Advantages that accompany the operation will also be described.

Figure 10:
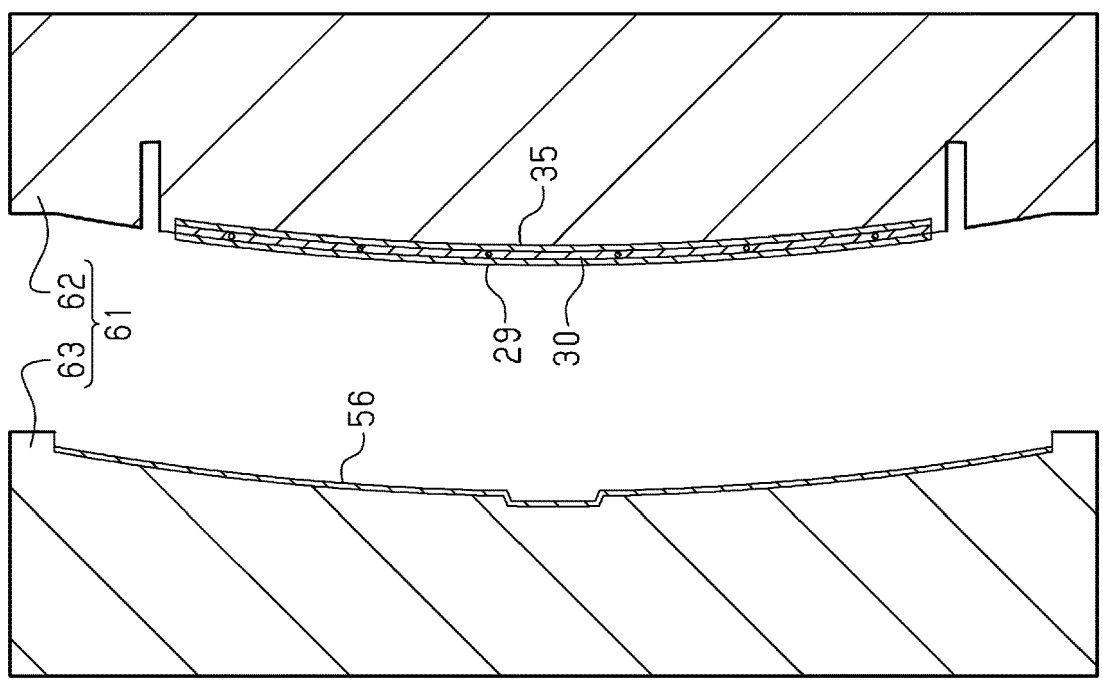
FIG. 10 is a cross-sectional side view illustrating part of a film setting step according to the second embodiment.
Figure 13:
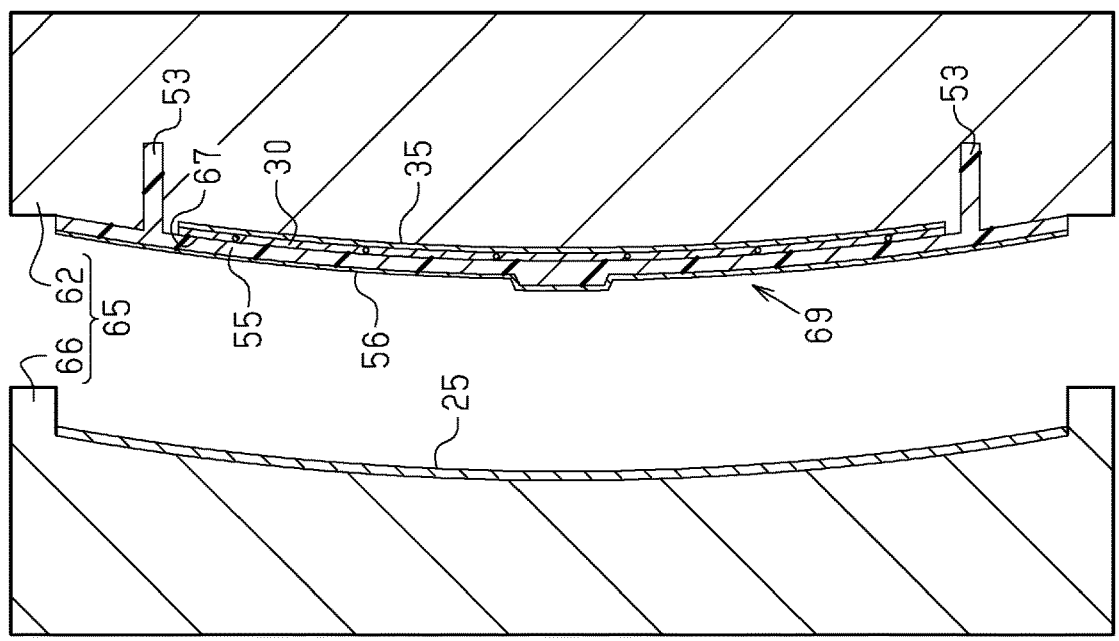
FIG. 13 is a cross-sectional side view showing a state in which the common molding die, which holds the intermediate of FIG. 12, is opposed to a secondary molding die, on which a hard coating film is set.

The near-infrared sensor cover 51 is manufactured by using a primary mold 61 and a secondary mold 65 and through a film setting step, a rear base molding step, and a front base molding step. As shown in FIG. 10, the primary mold 61 includes a common molding die 62 and a primary molding die 63. As shown in FIG. 13, the secondary mold 65 includes the common molding die 62 and a secondary molding die 66.

Figure 11:
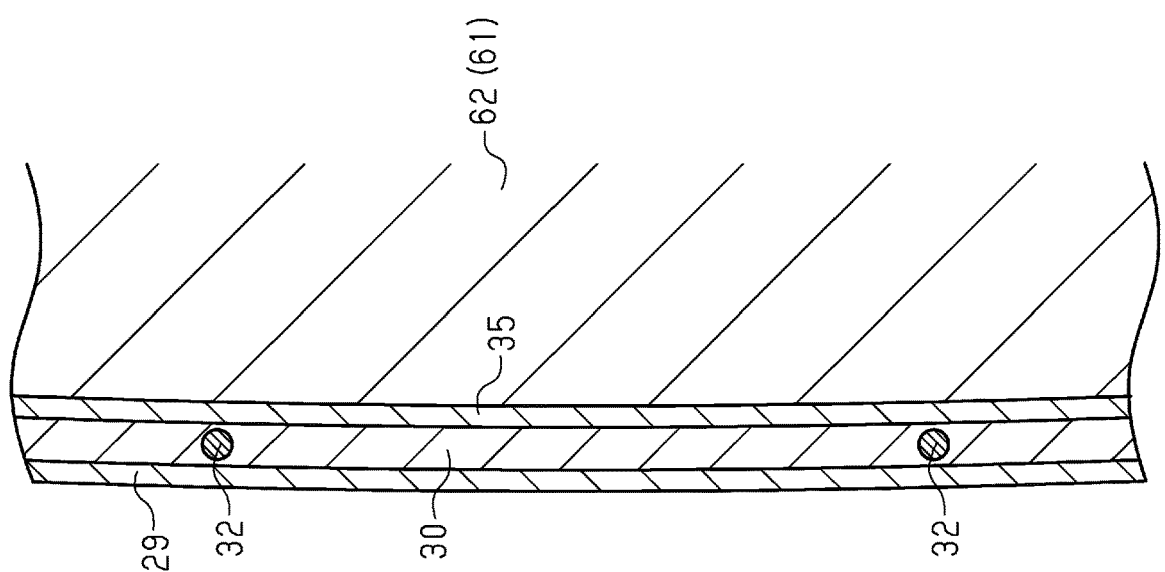
FIG. 11 is a partial cross-sectional side view of the common molding die, the reflection suppression layer, the heater film, and the binder layer in FIG. 10.

As shown in FIGS. 10 and 11, in the film setting step, the heater film 30, with the reflection suppression layer 35 bonded to the rear surface and a binder layer 29 formed on the front surface, is set on the common molding die 62. The decorative film 56 is set on the primary molding die 63. The hard coating film 25 is set on the secondary molding die 66 (refer to FIG. 13).

Figure 12:
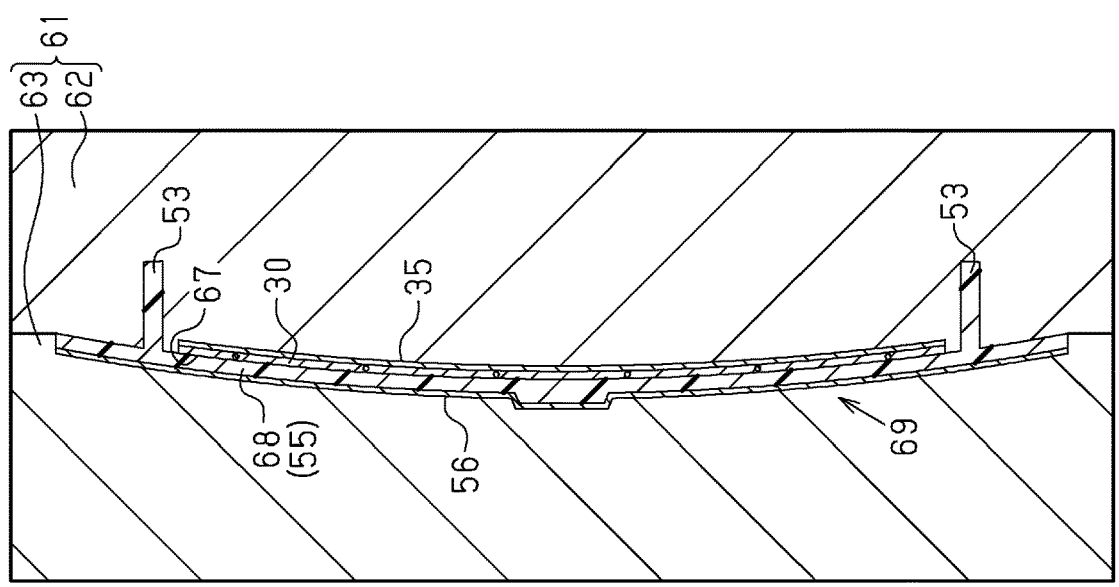
FIG. 12 is a cross-sectional side view showing a state in which, in order to form an intermediate, a rear base has been molded by injecting molten plastic into the gap between the heater film and the decorative film and curing the plastic in a rear base molding step of the second embodiment.

In the rear base molding step, the primary mold 61 is clamped as shown in FIG. 12. As the primary mold 61 is clamped, a gap (cavity) 67 is created between the heater film 30 and the decorative film 56. The gap 67 is filled with molten plastic 68. At this time, if the heat and the pressure of the molten plastic 68 are transferred to the heater film 30, the heater film 30 may be damaged.

In this respect, the second embodiment sets the heater film 30 with the binder layer 29 formed on the front surface is set on the common molding die 62. The heat and the pressure of the molten plastic 68 are thus transferred to the heater film 30 via the binder layer 29, as in the first embodiment. The binder layer 29 reduces the heat and the pressure transferred to the heater film 30. As compared to a case in which the binder layer 29 is not provided, the damage to the heater film 30 due to heat and pressure is reduced. The binder layer 29 is melted by the heat of the molten plastic 68 and disappears.

When the molten plastic 68 is cured, the rear base 55 is molded to be closely attached to the heater film 30 and the decorative film 56. Also, the attachment portion 53 is molded to be continuous with the rear base 55.

In this manner, at the same time as the rear base 55 is molded, the heater film 30 is stacked on the rear surface of the rear base 55 so as to be closely attached to the rear base 55. Also, at the same time as the rear base 55 is molded, the decorative film 56 is stacked on the front surface of the rear base 55 so as to be closely attached to the rear base 55. In other words, in the rear base molding step, the molding of the rear base 55, the stacking of the heater film 30, and the staking of the decorative film 56 are performed simultaneously. In this manner, through the rear base molding step, an intermediate 69 is formed, in which the rear base 55 is closely attached to the heater film 30 and the decorative film 56.

Thus, unlike the conventional technique, the present embodiment does not require a step for bonding the heater film 30 to the rear surface of the rear base 55 during the manufacture of the near-infrared sensor cover 51. This reduces the number of manufacturing steps.

Figure 15:
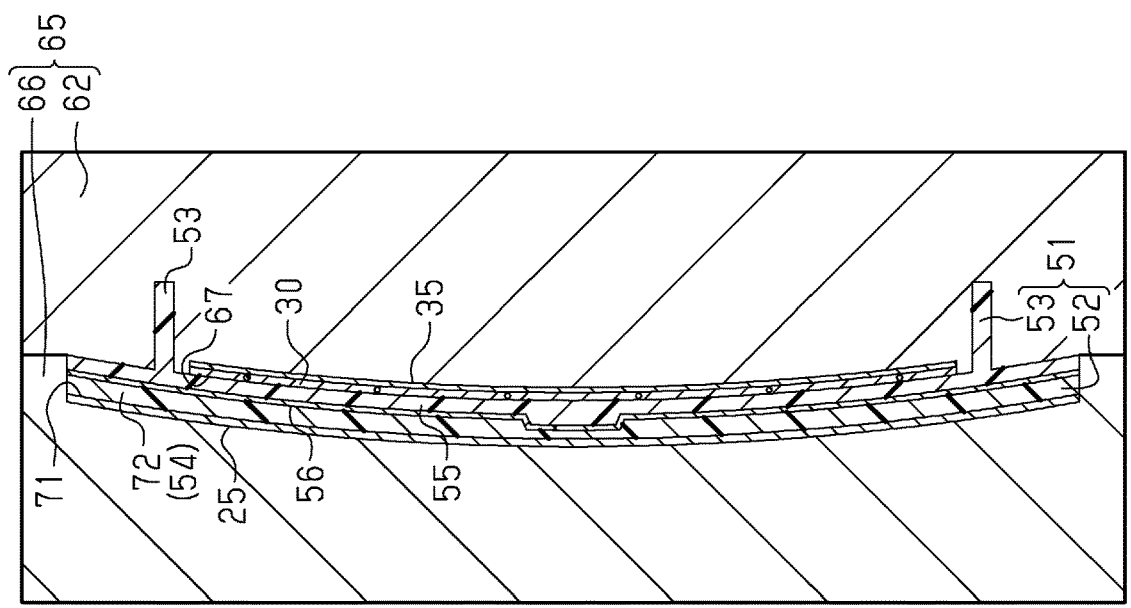
FIG. 15 is a cross-sectional side view showing a state in which, to mold a front base, molten plastic has been injected into the gap between the decorative film and the hard coating film shown in FIG. 14, and the molten plastic has been cured.
Figure 14:
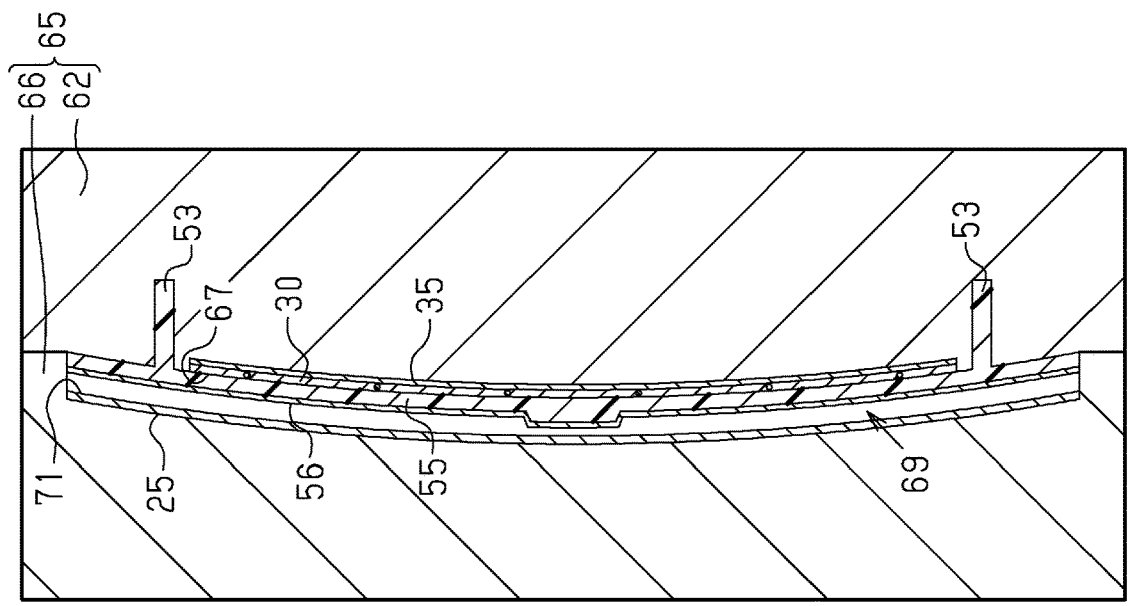
FIG. 14 is a cross-sectional side view showing a state in which the secondary mold is clamped in a front base molding step of the second embodiment.

In the front base molding step, the primary mold 61 and the secondary mold 65 are both opened. The common molding die 62, which is holding the intermediate 69, is moved from the position opposed to the primary molding die 63 to a position opposed to the secondary molding die 66 as shown in FIG. 13. Thereafter, the secondary mold 65 is clamped as shown in FIG. 14. As the secondary mold 65 is clamped, a gap (cavity) 71 is created between the decorative film 56 of the intermediate 69 and the hard coating film 25. When molten plastic 72 is injected into the gap 71 and cured, the front base 54 is molded so as to be closely attached to the decorative film 56 and the hard coating film 25 as shown in FIG. 15.

In this manner, at the same time as the front base 54 is molded, the decorative film 56 is stacked on the rear surface of the front base 54 so as to be closely attached to the front base 54. Also, at the same time as the front base 54 is molded, the hard coating film 25 is stacked on the front surface of the front base 54 so as to be closely attached to the front base 54. In other words, in the front base molding step, the molding of the front base 54, the stacking of the decorative film 56, and the staking of the hard coating film 25 are performed simultaneously.

Thus, unlike the conventional technique, the present embodiment does not require a step for forming a hard coating layer on the front surface of the front base 54 by applying a surface treatment agent to the front surface. This reduces the number of manufacturing steps.

In this manner, the near-infrared sensor cover 51 shown in FIGS. 8 and 9 is formed through the front base molding step.

The second embodiment thus provides the same advantages as the first embodiment. The advantages include the one achieved by using the binder layer 29 in order to omit the OCA on the front side. Such reduction in the number of components of the heater film 30 increases the transmissivity to the near-infrared rays IR1, IR2, improves the refraction, reduces the costs, and improves the close attachment.

When the near-infrared sensor cover 51 of the second embodiment is irradiated with visible light from the front, the visible light passes through the hard coating film 25 and the front base 54, and is reflected by the decorative film 56. Thus, when the near-infrared sensor cover 51 is seen from a position forward of the vehicle 10, the decorative film 56 appears to be located rearward of (on the far side of) the hard coating film 25 and the front base 54 through these components. The decorative film 56 thus decorates the near-infrared sensor cover 51, improving the appearance of the near-infrared sensor cover 51 and the surrounding portion.

Particularly, the decorative film 56 is provided between the front base 54 and the rear base 55 and is uneven. Thus, the decorative film 56 appears three-dimensionally from a position forward of the vehicle 10. This further improves the appearance of the near-infrared sensor cover 51 and the surrounding portion.

The reflection of visible light on the decorative film 56 occurs at a position forward of the near-infrared sensor 11. The decorative film 56 conceals the near-infrared sensor 11. Accordingly, the near-infrared sensor 11 cannot be seen easily from the front of the near-infrared sensor cover 51. The design is thus improved as compared to a case in which the near-infrared sensor 11 can be seen through the near-infrared sensor cover 51.

The above-described embodiments may be modified as follows. The above-described embodiment and the following modifications can be combined as long as the combined modifications remain technically consistent with each other.

In the second embodiment, the common molding die 62 may include two molding dies. In this case, one of the molding dies is used to mold the rear base 55 in the rear base molding step. The intermediate 69, which is obtained in the rear base molding step, is removed from the molding die. The intermediate 69 is transferred to the other molding die in the front base molding step. This molding die is used together with the secondary molding die 66 to mold the front base 54.

In the film setting step of the second embodiment, the timing at which the hard coating film 25 is set on the secondary molding die 66 may be simultaneous with or different from the timing at which the heater film 30 is set on the common molding die 62 and the timing at which the decorative film 56 is set on the primary molding die 63. For example, the timing at which the hard coating film 25 is set may be after the rear base molding step and before the front base molding step.

The configuration of the base in the near-infrared sensor cover 21 of the first embodiment, which is used as the cover 17 of the near-infrared sensor 11, may be used as the configuration of the base in the near-infrared sensor cover 51 of the second embodiment, which is provided separately from the near-infrared sensor 11. Also, the configuration of the base in the near-infrared sensor cover 51 of the second embodiment may be used as the configuration of the base in the near-infrared sensor cover 21 of the first embodiment.

The reflection suppression layer 35 may be omitted if the reflection of the near-infrared rays IR1, which are transmitted from the transmitting unit 15 of the near-infrared sensor 11, on the rear surfaces of the cover bodies 23, 52 is weak enough to be in a permissible range.

The binder layer 29 may be omitted if the heater film 30 is not significantly affected by the heat and the pressure of the molten plastic 44, 68 during molding of the plastic.

The near-infrared sensor covers 21, 51 can be used in a case in which the near-infrared sensor 11 is mounted in a section of the vehicle 10 different from the front section, for example, in the rear section. In this case, the near-infrared sensor 11 transmits the near-infrared rays IR1 rearward from the vehicle 10. The near-infrared sensor covers 21, 51 are arranged forward of the transmitting unit 15 in the transmission direction of the near-infrared rays IR1, that is, rearward of the transmitting unit 15 in the vehicle 10.

The near-infrared sensor covers 21, 51 can be used in a case in which the near-infrared sensor 11 is mounted in each of the sides in the front section or the rear section of the vehicle 10, that is, the front corners or the rear corners.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A manufacturing method for manufacturing a near-infrared sensor cover using a mold including a first molding die and a second molding die, wherein
    the near-infrared sensor cover includes a cover body, the cover body being configured to cover a transmitting unit and a receiving unit for near-infrared rays in a near-infrared sensor and having transmissiveness to near-infrared rays, and
    the cover body includes
        a base made of a plastic,
        a hard coating film that is arranged forward of the base in a transmission direction of the near-infrared rays and has a hardness higher than that of the base, and
        a heater film that is arranged rearward of the base in the transmission direction and has a wire-like heating element, the heating element generating heat when energized,
    the manufacturing method comprising:
    a film setting step including
        setting the heater film on the first molding die, and
        setting the hard coating film on the second molding die, and
    a base molding step for molding the base including clamping the mold, injecting molten plastic into a gap between the heater film and the hard coating film, and curing the molten plastic.

2. The manufacturing method for manufacturing the near-infrared sensor cover according to claim 1, wherein the setting the heater film in the film setting step includes setting, as the heater film on the first molding die, the heater film, which includes a binder layer on a front surface in the transmission direction.

3. A manufacturing method for manufacturing a near-infrared sensor cover using a primary mold and a secondary mold, wherein
    the primary mold includes a common molding die and a primary molding die,
    the secondary mold includes the common molding die and a secondary molding die,
    the near-infrared sensor cover includes a cover body, the cover body being configured to cover a transmitting unit and a receiving unit for near-infrared rays in a near-infrared sensor and having transmissiveness to near-infrared rays, and the cover body includes
  a decorative film,
  a front base made of a plastic, the front base being arranged forward of the decorative film in a transmission direction of the near-infrared rays,
  a rear base made of a plastic, the rear base being arranged rearward of the decorative film in the transmission direction,
  a hard coating film that is arranged forward of the front base in the transmission direction and has a hardness higher than that of the front base, and
  a heater film that is arranged rearward of the rear base in the transmission direction and has a wire-like heating element, the heating element generating heat when energized, the manufacturing method comprising:
a film setting step including
  setting the heater film on the common molding die,
  setting the decorative film on the primary molding die, and
  setting the hard coating film on the secondary molding die;

a rear base molding step for forming an intermediate by molding the rear base by clamping the primary mold, injecting molten plastic into a gap between the heater film and the decorative film, and curing the molten plastic, the intermediate including the rear base closely attached to the heater film and the decorative film; and a front base molding step including
  opening the primary mold and the secondary mold, and moving the common molding die, which is holding the intermediate, from a position opposed to the primary molding die to a position opposed to the secondary molding die, and
  after the common molding die is moved, molding the front base by clamping the secondary mold, injecting molten plastic into a gap between the decorative film and the hard coating film, and curing the molten plastic.

4. The manufacturing method for manufacturing the near-infrared sensor cover according to claim 3, wherein the setting the heater film in the film setting step includes setting, as the heater film on the common molding die, the heater film, which includes a binder layer on a front surface in the transmission direction.

* * * * *